US 8,159,615 B2

(12) United States Patent
Berbecel (10) Patent No.: US 8,159,615 B2
(45) Date of Patent: Apr. 17, 2012

(54) SYSTEM AND METHOD OF GEOMETRICAL PREDISTORTION OF OVERLAYING GRAPHICS SOURCES

(75) Inventor: Gheorghe Berbecel, Toronto (CA)

(73) Assignee: Sigma Designs, Inc., Milpitas, CA (US)

( * ) Notice: Subject to any disclaimer, the term of this patent is extended or adjusted under 35 U.S.C. 154(b) by 1300 days.

(21) Appl. No.: 11/782,813

(22) Filed: Jul. 25, 2007

(65) Prior Publication Data
US 2009/0027557 A1      Jan. 29, 2009

(51) Int. Cl.
*H04N 9/76* (2006.01)
(52) U.S. Cl. ........ 348/598; 348/600; 348/589; 348/563; 348/564; 348/584; 348/590; 348/591; 382/289; 382/299; 382/290; 353/69; 353/70
(58) Field of Classification Search .................. 348/598, 348/600, 589, 563, 564, 584, 590, 591; 382/289–290; 353/69, 70
See application file for complete search history.

(56) References Cited

U.S. PATENT DOCUMENTS

| | | | | |
|---|---|---|---|---|
| 5,594,676 | A * | 1/1997 | Greggain et al. | 708/300 |
| 6,540,365 | B1* | 4/2003 | Fujiwara et al. | 353/69 |
| 2003/0043303 | A1* | 3/2003 | Karuta et al. | 348/744 |
| 2003/0095239 | A1* | 5/2003 | Hirao et al. | 353/69 |
| 2004/0201594 | A1* | 10/2004 | Nashida et al. | 345/647 |
| 2005/0024597 | A1* | 2/2005 | Kubo et al. | 353/69 |
| 2005/0162620 | A1* | 7/2005 | Taguchi et al. | 353/69 |
| 2006/0203207 | A1* | 9/2006 | Ikeda et al. | 353/70 |
| 2007/0242233 | A1* | 10/2007 | Sokeila et al. | 353/69 |

* cited by examiner

*Primary Examiner* — Jefferey Harold
*Assistant Examiner* — Mustafizur Rahman
(74) *Attorney, Agent, or Firm* — Jones Day (57) ABSTRACT

A system and method of geometrical predistortion of a graphical source signal is provided in which the graphical source signal is merged with an input video signal for display on a display device. The input video signal is received at a hardware scaler device and a predistorted video signal is generated there from. A warping map is calculated using a programmed processor and a graphics source signal is then predistorted, in software, using the warping map to generate a warped graphical overlay signal. The predistorted video signal from the hardware scaler is then merged with the warped graphical overlay signal from the programmed processor.

16 Claims, 6 Drawing Sheets

32 — □ INPUT PIXEL
34 — ▲ OUTPUT PIXEL

SYSTEM AND METHOD OF GEOMETRICAL PREDISTORTION OF OVERLAYING GRAPHICS SOURCES

BACKGROUND

1. Field

The technology described in this patent document relates generally to the field of video signal processing More specifically, systems and methods are disclosed for performing geometrical predistortion of graphics source signals in software prior to merging the graphics source signals with an input video signal for display.

2. Related Art

There are many situations in the field of video signal processing in which one or more video signals are geometrically predistorted by the processing circuitry prior to being output to the video display device. One example of this occurs in video projectors that may project an image onto an angled surface. When doing so, the normally rectangular video image appears on the surface as a trapezoid. This is known as the keystone effect. In order to compensate for this trapezoidal appearance of the normally rectangular video image, the projector may employ a hardware predistortion circuit that predistorts the normally rectangular video image so that when it is projected onto the angled surface the image is rectangular.

In addition to this hardware predistortion circuit, it is also common in modern video projection or display devices to employ one or more video scaling devices, also typically implemented in hardware, which scale the source input video signal to an output video signal, typically at a different resolution or aspect ratio from the input video signal.

Figure 1:
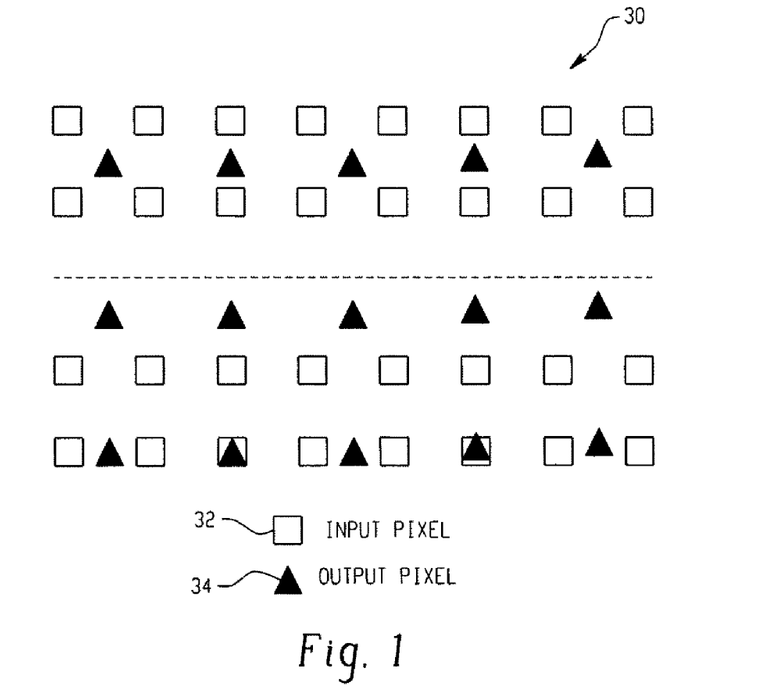
FIG. 1 is block diagram of a known system for scaling and predistorting a merged input video signal and graphics source signals.

FIG. 1 is a depiction of a video scaler operation on an input video. In this figure, the top portion of the depiction 30 represents the top of a video frame, and the bottom portion represents the bottom of the frame. The dashed line represents the missing remainder of the video frame. Here, the squares represent the input pixels and the triangles represent the output pixels from the scaler. As shown in FIG. 1, the video scaler is reducing the resolution of the input signal, but it may also increase the video resolution or even change the aspect ratio of the input video signal, such as by scaling a 4:3 aspect ratio signal typical of low-definition broadcast television into a 16:9 widescreen signal.

Figure 2:
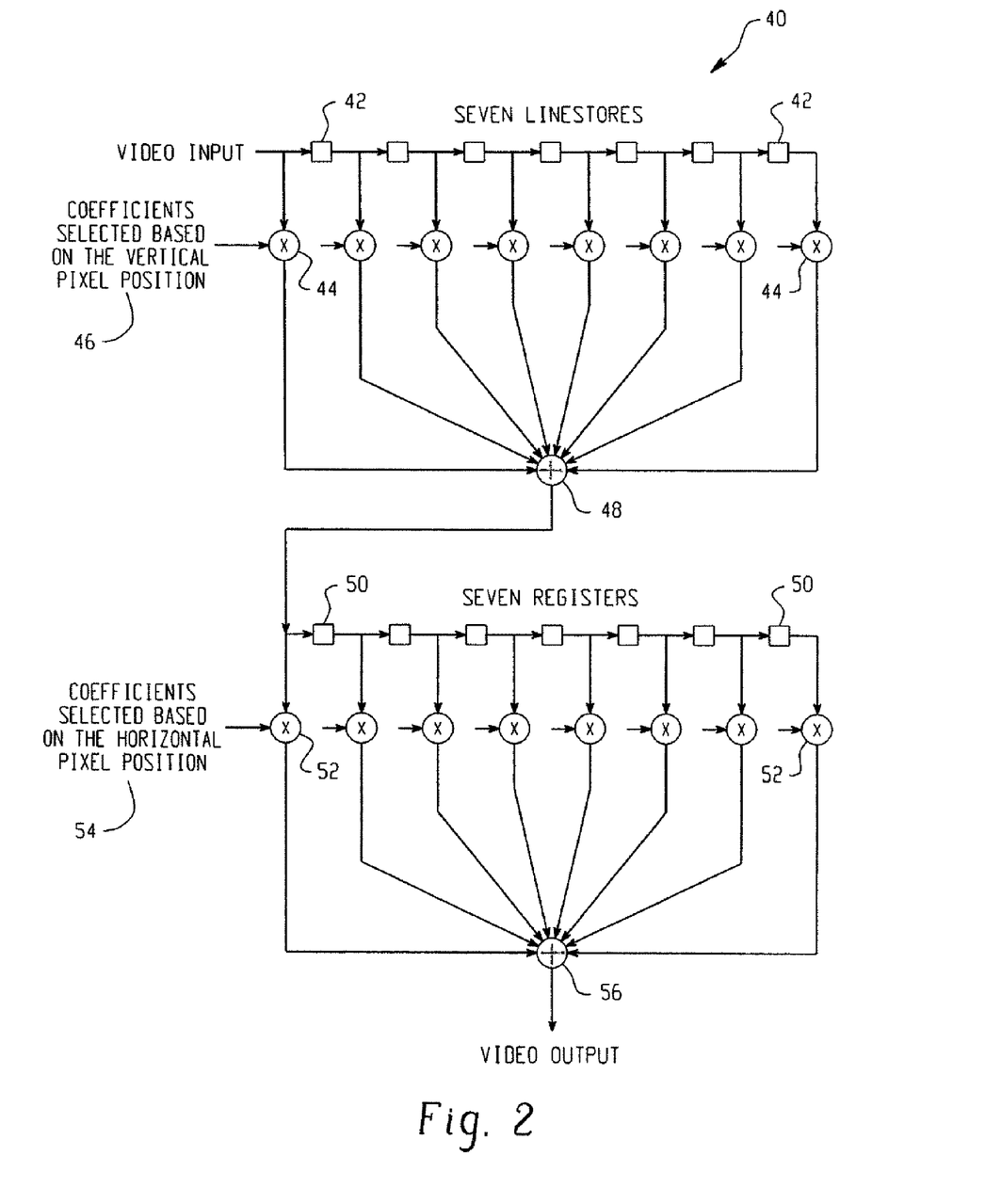
FIG. 2 is a depiction of a video scaler operation on an input video signal.

FIG. 2 is a block diagram of a typical hardware-implemented video scaler 40. This device, which can be used for the scaling operations noted above, and which also can be used for the predistortion function, includes a plurality of linestores 42, a plurality of registers 50, a plurality of multipliers 44, 52, and two adders 48, 56. The top portion of the scaler 40 receives the video input signal and sequentially buffers the input signal into one of the plurality of input linestores 42. These buffered video signals are then multiplied 44 by a first set of coefficients 46 that are selected based on the vertical pixel position of the desired output signal and then added together 48 to form a vertically scaled intermediate video signal. The vertically scaled intermediate video signal is then, in similar fashion, buffered in a set of registers 50 and multiplied by a second set of coefficients 54 that are selected based on the horizontal pixel position of the desired output. These multiplied outputs are then added together in the adder 56 to form the scaled video output signal. The circuitry shown in FIG. 2 can be very costly, particularly for high resolution scaling devices because the cost is proportional to the number of filter taps and the number of line stores to perform the vertical and horizontal scaling operation.

Figure 3:
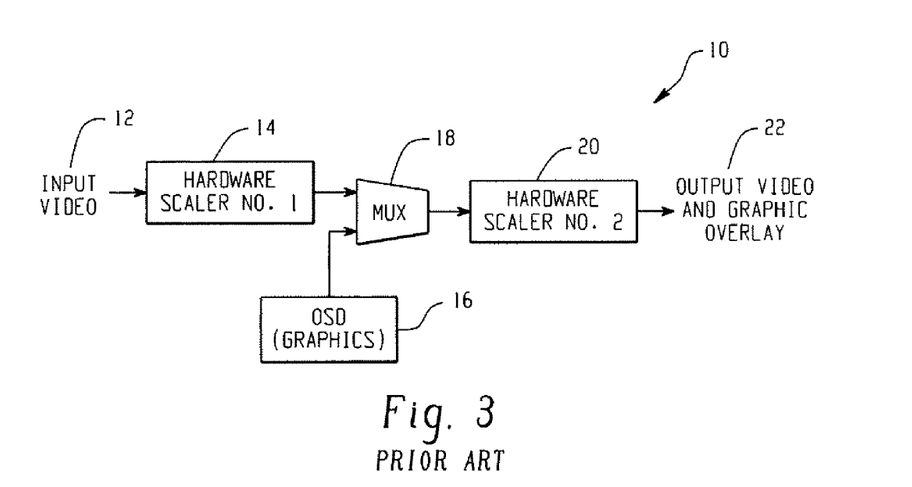
FIG. 3 is a block diagram of a typical hardware-implemented video scaler.

FIG. 3 is block diagram of a known system 10 for scaling and predistorting a merged input video signal 12 and graphics source signals 16. The graphics source signals 16 may be, for example, an on-screen display graphic overlay that is operated by a user of the video display device to change the operating characteristics of the display. In the system 10 shown in FIG. 3, the input video signal 12 is input to a first hardware scaler 14, which performs conversion of the resolution or aspect ratio of the input video signal to an output resolution or output aspect ratio as defined by the video display device in which the system 10 is operating. The output from the first hardware scaler is then merged with the graphic overlay from the graphics source 16 by the multiplexing device 18. This merged output video and graphic overlay signal is then processed by the second hardware scaler 20, which performs the above-described geometrical predistortion function on the merged signals.

When combining graphical source signals with input video signals, as shown in FIG. 3, it is not desirable to scale the resolution or aspect ratio of the graphical source signals, as it is the input video signal 12, but it is desirable to predistort both signal sources. In order to accomplish this separation, the system 10 must employ at least two hardware scalers 14, 20, a first hardware scaler 14 devoted to scaling just the input video signal, and a second hardware scaler 20 devoted to scaling the merged video/graphics signals in order to perform the predistortion function. Having two distinct hardware scalers, however, is costly and inefficient, for the reasons noted above.

SUMMARY

A system and method of geometrical predistortion of a graphical source signal is provided in which the graphical source signal is merged with an input video signal for display on a display device. The input video signal is received at a hardware scaler device and a predistorted video signal is generated there from. A warping map is calculated using a programmed processor and a graphics source signal is then predistorted, in software, using the warping map to generate a warped graphical overlay signal. The predistorted video signal from the hardware scaler is then merged with the warped graphical overlay signal from the programmed processor.

DETAILED DESCRIPTION OF THE DRAWINGS

Figure 4:
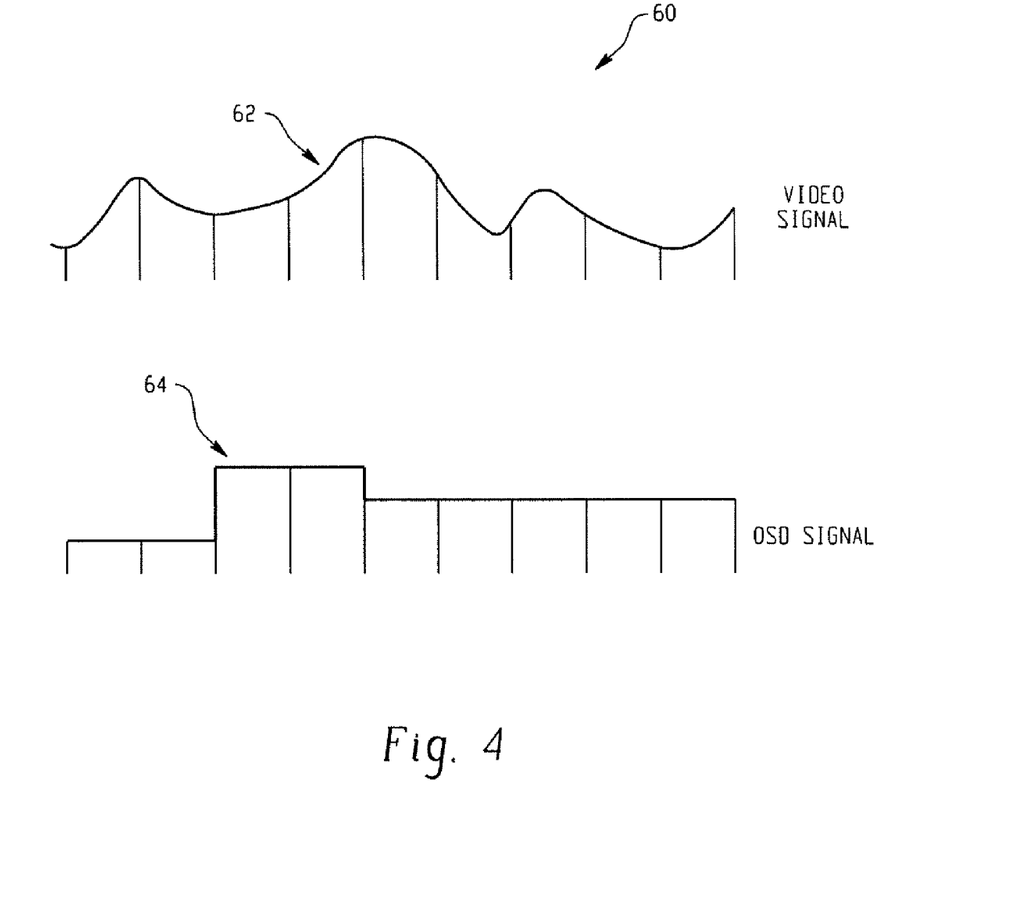
FIG. 4 is a depiction of the differences between an input video signal and a typical graphics source signal.

FIG. 4 is a depiction of the differences between an input video signal and a typical graphics source signal. The input video signal 62 typically varies gradually with time, whereas the graphics source signal 64 typically varies quite abruptly as the content of the graphics source signal typically consists of pixels that are not always correlated to each other. Other differences between the two signals include the spectrum content of the two signals and that the graphics source signal typically includes numerous flat areas where the pixel values do not change from pixel to pixel. Processing both of these types of signals with the same hardware-based video scaler, such as shown in the second hardware scaler 20 of FIG. 3, in order to carry out the predistortion function, is sub-optimal. This is because the input video signal typically would require a video scaler with a large number of filter coefficients, whereas the graphics source signal would only require a small number of filter coefficients. Moreover, in the flat areas of the graphics source signal 64, complex filtering is not required because the result of filtering would merely reproduce the value of the flat area that is already known.

Figure 5:
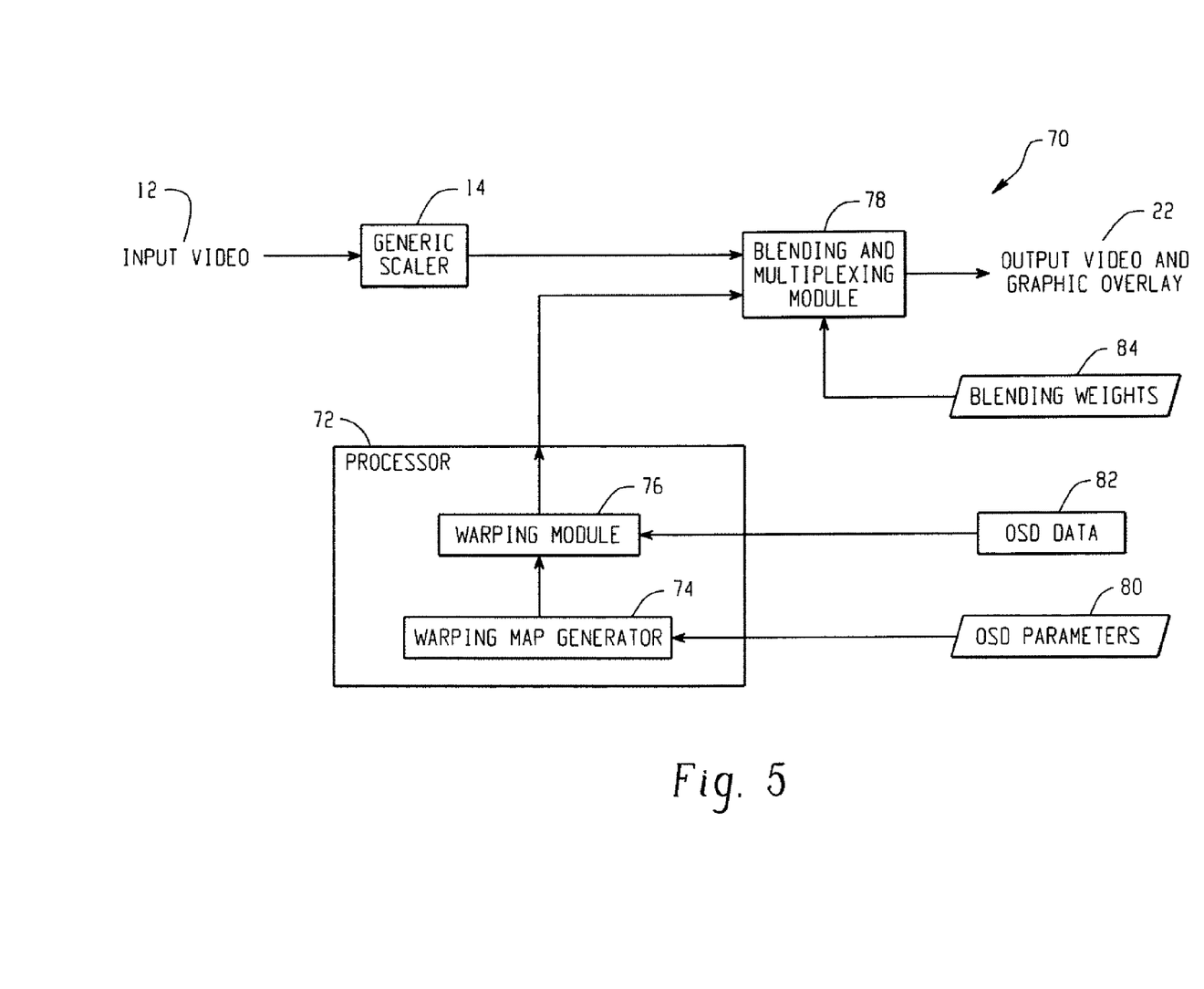
FIG. 5 is a block diagram of an exemplary system for geometrical predistortion of graphics source signals and for merging the graphics source signals with a scaled input video signal.

FIG. 5 is a block diagram of an exemplary system for geometrical predistortion of graphics source signals and for merging the graphics source signals with a scaled input video signal. This system (and method of operation) addresses the problems noted herein with respect to systems such as shown in FIG. 3 that require two, discrete hardware scalers. The system of FIG. 5 includes a single, generic hardware scaler 14, a processing device 72 programmed with software instructions for generating one or more predistorted graphical overlays based on graphics source signals, and a blending and multiplexing module 78 for merging the scaled input video signal from the scaler 14 with the predistorted graphics overlay signal(s) from the programmed processor 72.

Operationally, the system of FIG. 5 separates the single predistortion function carried out in the second hardware scaler 20 shown in FIG. 3, which operates on the merged input video and graphics signals, into two functions. The first predistortion function is built into the hardware scaler 14, which now performs both the traditional scaling operations, such as upconversion to a higher density pixel format, and the predistortion function on the input video signal. The second predistortion function is now carried out via software programmed into a processing device 72. This software, which is described in more detail herein, operates on the graphics source signals to generate a predistorted graphical overlay that is subsequently merged with the predistorted and scaled input video signal by the multiplexing module 78. By separating the predistortion functions in this manner, and in particular by predistorting the graphics source signals via software, the system of FIG. 5 eliminates the second hardware scaler 20 shown in FIG. 3, thereby reducing the cost and complexity of the system.

More specifically, the software-programed processor 72 includes a warping map generator 74 and a warping module 76, which are used to generate the warped graphic overlay signals. One example of such a graphic overlay signal may be an on-screen display area which provides a graphical user interface for controlling the display device or other components connected thereto. In this example of an on-screen display graphical overlay, the warping map generator 74 receives on-screen display parameters 80, which typically define the geometry of the on-screen display window within the video frame. Thus, for example, the on-screen display window may be a small window located in the bottom left corner of the video frame. The on-screen display parameters 80 are used by the warping map generator to define this graphical overlay window. Other graphical parameters may also be provided to the warping module, including the function to be used when warping the graphical source data 82. This warping function is used by the warping map generator to define the level of predistortion to be applied to the graphical source signal and effectively provides an input-to-output mapping that predistorts the graphics source signal by mapping a particular pixel in the standard input video frame to another pixel location in the output video frame.

The warping module 76 receives information from the warping map generator regarding the size, position and location of the one or more graphical overlays, and the function to be applied when warping the graphical source data, and generates a warped graphical overlay signal from the graphical source data 82 and the information from the warping map generator. This warped graphical overlay signal is then provided by the software-programmed processor to the blending and multiplexing module 78.

The blending and multiplexing module 78 performs two functions. First, it merges the predistorted and scaled input video signal 12 from the hardware scaler with the predistorted graphic overlay signals from the processor 72. Second, this module 78 may generate a blending area surrounding the graphic overlay areas within the merged output video signal to create a smooth transition from the graphical overlay area to the area of normal video. This blending operation can occur for each of the one or more graphical overlay areas generated by the processor 72, and the level of blending to apply may be controlled by a set of blending weights 84 which provide linear or non-linear blending operations on the pixels in the one or more blending areas. The blending and multiplexing module 78 outputs the merged video and graphic overlay signals to the display device in which the system 70 is operating.

The system shown in FIG. 5 can be used with any video projection, television or other type of display device that combines video scaling with graphics source data. The graphics source data can be any type of alphanumeric, numeric or textual data that is overlaid or merged with the input video signal, such as an on screen display and control interface, close captioning, or other forms of information and control interfaces.

Figure 6:
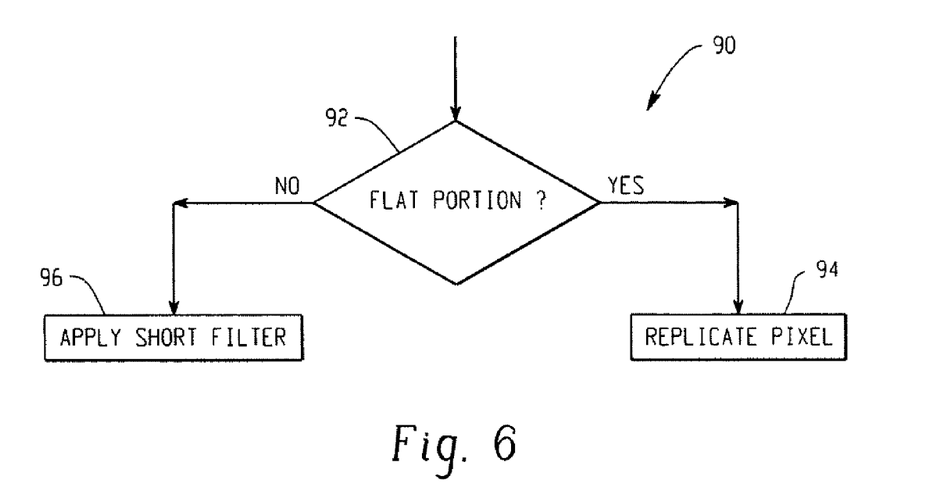
FIG. 6 is a block diagram of an exemplary method for processing the pixel data of the graphics source signals.

FIG. 6 is a block diagram of an exemplary method for processing the pixel data of the graphics source signals. As shown in FIG. 4, the graphical source signals 64 are typified by sharp transitions between relatively flat areas in which many neighboring pixel share the same pixel values. This is distinguished from the input video signal 62, which is typified by smooth transitions in which neighboring pixels do not necessarily share the same pixel values. By separating the input video signal processing from the graphics source signal processing, as shown in FIG. 5, it is not necessary to perform complex filtering operations on the graphics source signals, but instead a more simple pixel filtering and replicating operation may take place in the processor 72. In FIG. 6, the processor is programmed to recognize a flat portion 92 of the graphics source signal 64. If the current pixel being processed is within one of these flat potions, then the pixel value is simply a replication of the pixel value from the graphics source signal 94. But, if the pixel is not in a flat portion, but instead is in a rapidly changing portion of the graphics source signal, then a short filter is applied to the pixel value at 96. This simple filtering operation is distinguished from the much more complex filtering function that may be applied to the input video signal, thus reducing the processing complexity of the overall system.

Figure 7:
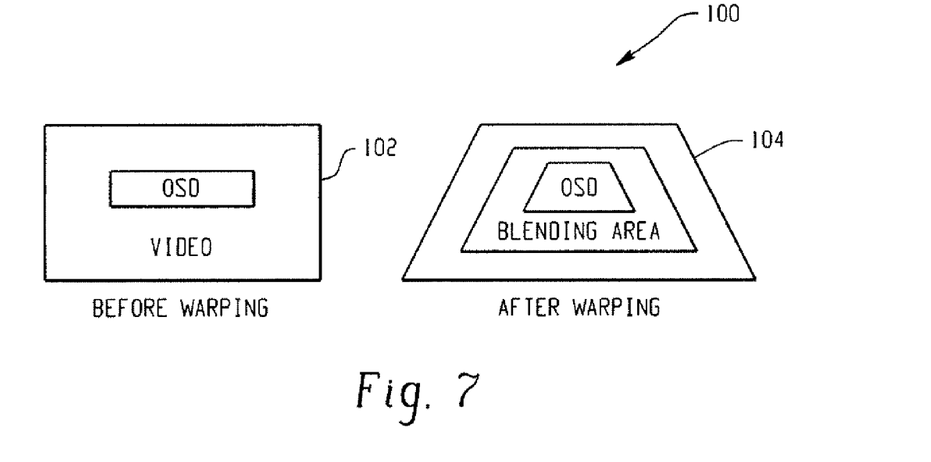
FIG. 7 is a depiction of the merged graphical source signals and input video signal before and after predistortion via the exemplary system of FIG. 5.

FIG. 7 is a depiction 100 of the merged graphical source signals and input video signal before 102 and after 104 predistortion via the exemplary system of FIG. 5. In the before depiction 102, the on-screen display graphic overlay and the video frame are both square in configuration. After processing by the exemplary system of FIG. 5, however it can be seen in 104 that the video frame and the overlaid graphics are now predistorted in a trapezoidal manner, and in particular have been predistorted to take into account the keystone effect produced by projecting a rectangular image onto an angled surface. Also shown in FIG. 7 is the blending area surrounding the graphical overlay, which is also configured in a predistorted manner. As described in more detail below, the blending area is defined using one or more blending weights so as to provide a smooth transition in the output signal between the graphics source signals and the input video signals.

Figure 8:
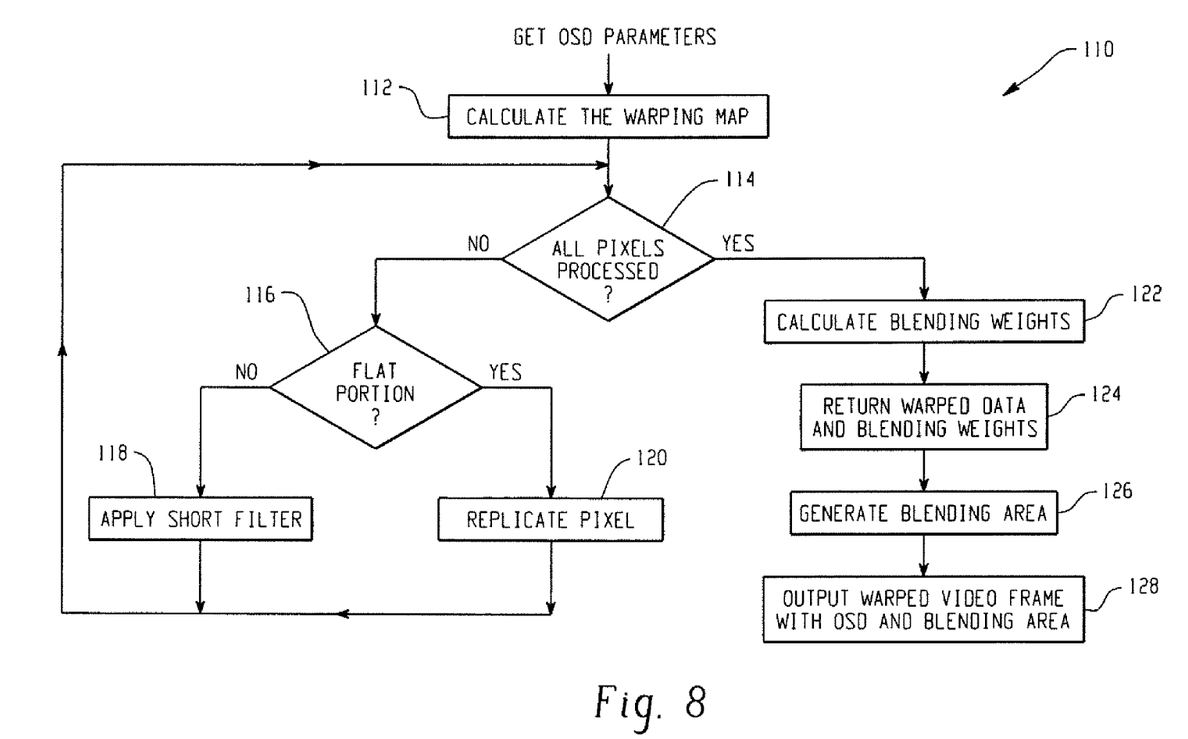
FIG. 8 is an exemplary flow diagram of the processing steps for geometrical predistortion of the graphics source signals and merging thereof with the scaled input video signal in the exemplary system of FIG. 5.

FIG. 8 is an exemplary flow diagram 110 of the processing steps for geometrical predistortion of the graphics source signals and merging thereof with the scaled input video signal in the exemplary system of FIG. 5. The process begins with the generation of the warping map in step 112 using the graphics parameters. As noted above in the discussion of FIG. 5, the graphics parameters may include data that defines the size, location and position of the graphics overlay in the video frame, such as in the example of an on-screen display. Other parameters associated with the configuration and format of the warped video frame may also be provided in this step. Having calculated the warping map in step 112, the software-programmed processor 72 then processes the pixel data in the video frame using the graphics source signal data (82 in FIG. 5) and the warping map in steps 116-120. In these steps, the processor 72 determines the location and value of each pixel in the warped video frame. Steps 116-120 are similar to steps 92-96 in FIG. 6, in which the processor examines surrounding pixel data in the graphics source signal and determines whether to apply a short filter to the value of each pixel.

After the pixels in the video frame are processed, as determined at step 114, the processor 72 then calculates the blending weights at step 122 to be used in the optional blending area process. As noted previously, the process described herein may generate more than one graphical overlay area to be warped and merged with the input video signal, and thus the processor 72 may also calculate the same or different blending weights to be associated with each of the one or more graphical overlay areas. Having calculated the blending weights, the processor 72 then outputs the warped video frame containing the one or more graphical overlay areas and the blending weights. These signals are provided to the blending and multiplexing module 78 for generation of the final video output to be displayed.

The one or more blending areas are generated in step 126 using the warped input video signal from the hardware scaler 14, the warped video frame having the graphical overlay data from the processor 72 and the blending weights 84. As shown in FIG. 7, the blending areas are preferably transitional areas between the input video signal and the graphical overlay signals and also preferably surround the graphical overlay regions. The pixel values in the blending areas are generated using the blending weights and preferably comprise a gradual transition between the pixel values of the input video signal and the pixel values within the graphical overlay. The blending function provided by the blending weights may be a linear function or it may be non-linear. Moreover, as noted above, there may be a plurality of graphical overlay areas in the video frame, and each of the plurality of graphical overlay areas may also have an associated blending area. Each of these blending areas may be generated using the same blending weights, or each may use a different set of blending weights. Finally, in step 128 the warped video frame with the graphical overlay(s) and the one or more blending areas are output to the display for presentation.

This written description uses examples to disclose the invention, including the best mode, and also to enable a person skilled in the art to make and use the invention. The patentable scope of the invention may include other examples that occur to those skilled in the art.

It is claimed:

1. A method of merging a graphical source signal with an input video signal for display on a display device, comprising:
   receiving an input video signal at a hardware scaler device and generating a predistorted video signal;
   receiving a graphics sources signal at a programmed processor, the programmed processor (i) calculating a warping map and (ii) warping the graphics source signal using the warping map to generate a warped graphical overlay signal, wherein the warping comprises:
      analyzing pixel values of the graphics source signal to identify at least one non-flat portion and at least one flat portion of the graphics source signal,
      applying a filter to the pixel values associated with the non-flat portion of the graphics source signal, and
      replicating the pixel values associated with the flat portion of the graphics source signal without applying any filtering thereto; and
   merging the predistorted video signal from the hardware scaler with the warped graphical overlay signal from the program processor.

2. The method of claim 1, further comprising:
   receiving one or more graphical display parameters associated with the graphical overlay signal; and
   calculating the warping map using the one or more graphical display parameters.

3. The method of claim 2, wherein the one or more graphical display parameters comprise the location of a graphical overlay in a displayed video signal.

4. The method of claim 3, wherein the graphical overlay signal is an on-screen display for controlling the configuration of the display device.

5. The method of claim 1, further comprising:
   generating a blending area surrounding the warped graphical overlay signal from the programmed processor; and
   merging the blending area with the predistorted video signal and the warped graphical overlay signal.

6. The method of claim 5, further comprising:
   calculating a set of blending weights associated with the blending area; and
   setting the pixel values of the blending area based upon the set of blending weights and the pixel values of the predistorted video signal and the warped graphical overlay signal.

7. The method of claim 1, further comprising:
   receiving a plurality of graphics source signals at the programmed processor and generating a plurality of warped graphical overlay signals using the warping map; and
   merging the predistorted video signal from the hardware scaler with the plurality of warped graphical overlay signals from the programmed processor.

8. The method of claim 7, further comprising:
generating a plurality of blending areas surrounding the plurality of warped graphical overlay signals from the programmed processor; and
merging the plurality of blending areas with the predistorted video signal and the plurality of warped graphical overlay signals.

9. A system for geometrical predistortion of a graphical source signal and an input video signal, comprising:
a hardware scaler for receiving the input video signal and for generating a predistorted video signal;
means for calculating a warping map and for warping the graphics source signal using the warping map to generate a warped graphical overlay signal, wherein the warping comprises:
analyzing pixel values of the graphics source signal to identify at least one non-flat portion and at least one flat portion of the graphics source signal,
applying a filter to the pixel values associated with the non-flat portion of the graphics source signal, and
replicating the pixel values associated with the flat portion of the graphics source signal without applying any filtering thereto; and
means for merging the predistorted video signal from the hardware scaler with the warped graphical overlay signal.

10. The system of claim 9, further comprising:
means for receiving one or more graphical display parameters associated with the graphical overlay signal; and
means for calculating the warping map using the one or more graphical display parameters.

11. The system of claim 10, wherein the one or more graphical display parameters comprise the location of a graphical overlay in a displayed video signal.

12. The system of claim 11, wherein the graphical overlay signal is an on-screen display for controlling the configuration of the display device.

13. The system of claim 9, further comprising:
means for generating a blending area surrounding the warped graphical overlay signal; and
means for merging the blending area with the predistorted video signal and the warped graphical overlay signal.

14. The system of claim 13, further comprising:
means for calculating a set of blending weights associated with the blending area; and
means for setting the pixel values of the blending area based upon the set of blending weights and the pixel values of the predistorted video signal and the warped graphical overlay signal.

15. The system of claim 9, further comprising:
means for receiving a plurality of graphics source signals and for generating a plurality of warped graphical overlay signals using the warping map; and
means for merging the predistorted video signal from the hardware scaler with the plurality of warped graphical overlay signals.

16. The system of claim 15, further comprising:
means for generating a plurality of blending areas surrounding the plurality of warped graphical overlay signals; and
means for merging the plurality of blending areas with the predistorted video signal and the plurality of warped graphical overlay signals.

* * * * *